(Model.)

J. H. BLACK.
CAR WHEEL AND AXLE.

No. 322,575. Patented July 21, 1885.

WITNESSES:

INVENTOR:
J. H. Black.
BY Munn & Co
ATTORNEYS.

UNITED STATES PATENT OFFICE.

JOSEPH H. BLACK, OF COLUMBIA, PENNSYLVANIA.

CAR WHEEL AND AXLE.

SPECIFICATION forming part of Letters Patent No. 322,575, dated July 21, 1885.

Application filed May 9, 1885. (Model.)

*To all whom it may concern:*

Be it known that I, JOSEPH H. BLACK, of Columbia, in the county of Lancaster and State of Pennsylvania, have invented a new and Improved Car Wheel and Axle, of which the following is a full, clear and exact description.

My invention relates to improved means for securing car and other wheels upon their axles whereby a secure attachment of the wheel to the axle may be effected at comparatively small cost, and the wheel can be removed from the axle, if desired.

Reference is to be had to the accompanying drawings, forming part of this specification, in which similar letters of reference indicate corresponding parts in all the figures.

Figure 1:
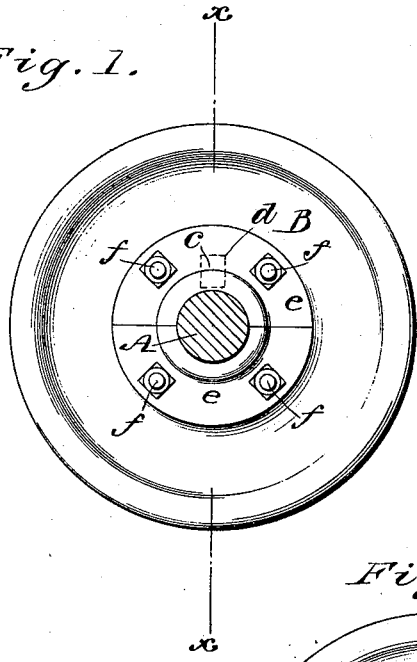
Figure 2:
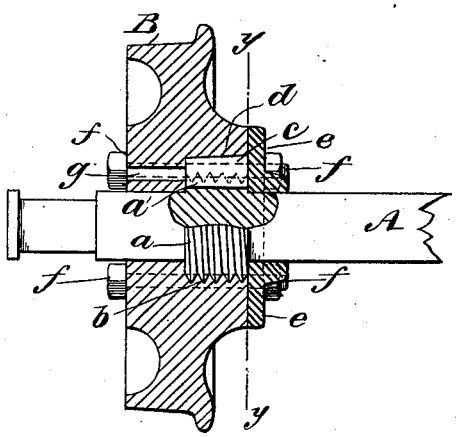
Figure 3:
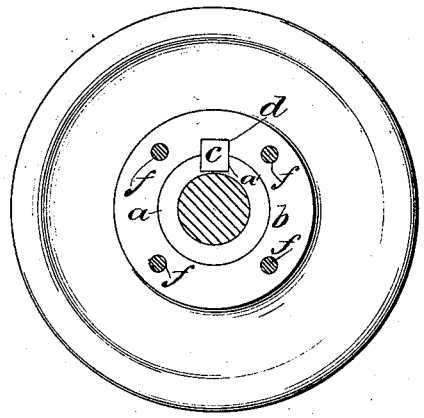

Figure 1 is a side elevation of the wheel, showing the axle in section. Fig. 2 is a broken sectional elevation taken on line $x\,x$ of Fig. 1, and Fig. 3 is a sectional elevation on line $y\,y$ of Fig. 2.

The axle A is formed with an enlarged screw-threaded collar, $a$, which is slotted at $a'$ to receive a key, $c$. Otherwise the axle A is of the usual or of any approved construction. The wheel B is formed with the screw-threaded recess $b$ to receive the screw-threaded collar $a$, and the wheel is notched at $d$, to correspond with notch $a'$, to receive key $c$, for fastening the wheel upon the axle A. For strengthening the wheel B, and for holding the key $c$ in place, I place on axle A the semicircular washers $e\,e$, and bolt them firmly to the wheel B by screw-bolts $f\,f$, passing through the wheel and washers, as shown, and for drawing out the key $c$, in case the wheel is to be removed from the axle, I form through the wheel, in line with the recess $d$, a passage, $g$, in which a small tool may be inserted for driving back the key, as will be understood from Fig. 2.

By constructing the wheel and axle as described, the wheel has simply to be screwed upon the axle and the key $c$ inserted, which will key the wheel fast to the screw-threaded collar $a$. Then the semicircular washers $e$ are to be put in place and bolted, which will make the attachment of the wheel to the axle perfectly secure, and when desired the wheel may be removed from the axle.

Having thus described my invention, what I claim as new, and desire to secure by Letters Patent, is—

1. The axle A, formed with screw-threaded collar $a$, slotted at $a'$, in combination with wheel A, having screw-threaded recess $b$, and slotted at $d$ to receive key $c$, substantially as described.

2. The wheel B, having screw-threaded recess $b$, and recess $d$ for a key, and the axle A, having screw-threaded collar $a$, in combination with the washers $e\,e$, placed upon the axle and bolted to the wheel, substantially as and for the purposes set forth.

3. The wheel A, having screw-threaded recess $b$, and notched at $d$, and formed with the passage $g$, substantially as described.

JOSEPH H. BLACK.

Witnesses:
 JACOB S. STIME,
 W. W. UPP.